United States Patent
Gunn et al.

(10) Patent No.: US 10,018,126 B2
(45) Date of Patent: *Jul. 10, 2018

(54) SYSTEM AND METHOD FOR OPERATING A DIESEL ENGINE

(71) Applicant: CLARK EQUIPMENT COMPANY, Statesville, NC (US)

(72) Inventors: John Thomas Gunn, Charlotte, NC (US); Robert Porter Edwards, Mt. Airy, NC (US); Barry Eugene Reavis, Winston Salem, NC (US)

(73) Assignee: Clark Equipment Company, Statesville, NC (US)

( * ) Notice: Subject to any disclaimer, the term of this patent is extended or adjusted under 35 U.S.C. 154(b) by 32 days.

This patent is subject to a terminal disclaimer.

(21) Appl. No.: 15/065,426

(22) Filed: Mar. 9, 2016

(65) Prior Publication Data

US 2016/0186675 A1 Jun. 30, 2016

Related U.S. Application Data (63) Continuation of application No. 14/267,975, filed on May 2, 2014, now Pat. No. 9,308,910.

(Continued)

(51) Int. Cl.
*B60L 1/00* (2006.01)
*F02D 29/06* (2006.01)
(Continued)

(52) U.S. Cl.
CPC ................ *F02D 29/06* (2013.01); *B60K 6/46* (2013.01); *B60L 1/00* (2013.01); *B60W 10/30* (2013.01);
(Continued)

(58) Field of Classification Search
CPC ............ B60W 20/1082; B60L 2270/12; B60L 2200/40; B60L 1/00; F03D 5/02; H02P 31/00
(Continued)

(56) References Cited

U.S. PATENT DOCUMENTS 3,526,778 A 9/1970 Crocker et al.
4,129,893 A 12/1978 Angello
(Continued)

FOREIGN PATENT DOCUMENTS

DE 102008038821 7/2009
GB 2453561 4/2009
(Continued)

OTHER PUBLICATIONS

Extended European Search Report from the European Patent Office for Application No. 14791388.3 dated Dec. 2016 (8 pages).
(Continued)

*Primary Examiner* — Julio C. Gonzalez
(74) *Attorney, Agent, or Firm* — Michael Best & Friedrich LLP (57) ABSTRACT

A power generating set includes an engine operable in response to a flow of fuel to produce a flow of exhaust gas, a generator coupled to the engine and operable in response to operation of the engine to produce a total electrical power, and a primary load electrically connected to the generator to receive a portion of the total electrical power, the primary load having a cyclical pattern. A battery bank is selectively connected to the generator to receive a portion of the total electrical power and an insulated-gate bipolar transistor (IGBT) is positioned to selectively transition between a connected state and a disconnected state. The battery bank is connected to the generator to charge the battery bank when (Continued)

the IGBT is in the connected state and is disconnected from the generator when the IGBT is in the disconnected state.

19 Claims, 4 Drawing Sheets

Related U.S. Application Data (60) Provisional application No. 61/818,532, filed on May 2, 2013.

(51) Int. Cl.
| | |
|---|---|
| *B60K 6/46* | (2007.10) |
| *B60W 10/30* | (2006.01) |
| *B60W 20/16* | (2016.01) |
| *F01N 3/021* | (2006.01) |
| *F01N 3/023* | (2006.01) |
| *F02D 35/00* | (2006.01) |
| *H02K 7/18* | (2006.01) |
| *H02P 9/04* | (2006.01) |
| *F01N 9/00* | (2006.01) |
| *F02D 41/20* | (2006.01) |
| *F01N 3/027* | (2006.01) |
| *F02D 41/02* | (2006.01) |
| *F02B 3/06* | (2006.01) |

(52) U.S. Cl.
CPC ............ *B60W 20/16* (2016.01); *F01N 3/021* (2013.01); *F01N 3/023* (2013.01); *F01N 3/027* (2013.01); *F01N 9/002* (2013.01); *F02D 35/0007* (2013.01); *F02D 41/021* (2013.01); *F02D 41/20* (2013.01); *H02K 7/1815* (2013.01); *H02P 9/04* (2013.01); *B60L 2200/26* (2013.01); *B60L 2200/32* (2013.01); *B60L 2200/40* (2013.01); *B60L 2240/36* (2013.01); *B60L 2240/445* (2013.01); *B60L 2270/12* (2013.01); *B60Y 2300/476* (2013.01); *F01N 2590/06* (2013.01); *F01N 2590/10* (2013.01); *F01N 2900/08* (2013.01); *F01N 2900/1404* (2013.01); *F02B 3/06* (2013.01); *F02D 41/029* (2013.01); *F02D 2041/026* (2013.01); *F02D 2041/2075* (2013.01); *Y02T 10/47* (2013.01)

(58) Field of Classification Search
USPC ........................................ 290/40 R, 40 C, 52
See application file for complete search history.

(56) References Cited

U.S. PATENT DOCUMENTS

| | | | |
|---|---|---|---|
| 5,488,283 A * | 1/1996 | Dougherty | .......... B60L 11/1855 307/10.1 |
| 6,724,099 B2 | 4/2004 | Klaar | |
| 6,949,843 B2 | 9/2005 | Dubovsky | |
| 8,244,200 B2 | 8/2012 | Orr et al. | |
| 9,308,910 B2 * | 4/2016 | Gunn | ....................... B60K 6/46 |
| 2002/0163819 A1* | 11/2002 | Treece | ................ H01F 27/2804 363/20 |
| 2008/0048451 A1 | 2/2008 | Herzog et al. | |
| 2008/0276610 A1 | 11/2008 | McDowell | |
| 2010/0186373 A1 | 6/2010 | Pierz et al. | |
| 2011/0253113 A1 | 10/2011 | Roth et al. | |
| 2012/0003131 A1* | 1/2012 | Ibrahim | ............... B01D 46/002 423/212 |
| 2012/0073467 A1 | 3/2012 | Geraud et al. | |
| 2014/0327248 A1 | 11/2014 | Gunn et al. | |

FOREIGN PATENT DOCUMENTS

| | | |
|---|---|---|
| JP | 2011127534 | 6/2011 |
| JP | 2013024166 | 2/2013 |

OTHER PUBLICATIONS

Written Opinion of the International Searching Authority for International Application No. PCT/US2014/036484 dated Oct. 1, 2014 (5 pages).

Search Report of the International Searching Authority for International Application No. PCT/US2014/036484 dated Oct. 1, 2014 (5 pages).

* cited by examiner

SYSTEM AND METHOD FOR OPERATING A DIESEL ENGINE

RELATED APPLICATION DATA

This application is a continuation of U.S. application Ser. No. 14/267,975, filed May 2, 2014, and now U.S. Pat. No. 9,308,910, which claims priority to U.S. Provisional Application No. 61/818,532, filed May 2, 2013, the entire contents of each are incorporated herein by reference.

BACKGROUND

The present invention relates to the arrangement and operation of a diesel engine system. More particularly, the invention relates to the arrangement and operation of a diesel engine system that powers a highly cyclic load.

Diesel engines are often used to provide an efficient and compact source of power. Diesel engines can be used in mobile applications, such as in a truck, a locomotive, a ship, or other vehicle. In addition, diesel engines are often used to provide power in stationary applications such as portable or standby generators, air compressors, pumps, and the like.

Diesel engines are known to produce particulate emissions (soot) during operation under certain conditions. In some applications, filters are employed to capture the soot and reduce the particulate emissions of the engine.

SUMMARY

In one construction, the invention provides a diesel engine that includes a particulate filter in the emission stream of the diesel engine. The engine is arranged to drive a cyclic load and an auxiliary load. The auxiliary load is variable to maintain the total load on the diesel engine above a predetermined load point for 100 percent of the operating cycle of the load or to maintain the total load on the diesel engine above a second load point for between 10 percent and 40 percent of the cycle of the cyclic load. The second load point is higher than the first load point. In preferred constructions, the second load point is maintained for between 15 percent and 30 percent of the cycle of the cyclic load.

In one construction, the invention provides a power generating set that includes an engine operable in response to a flow of fuel to produce a flow of exhaust gas. A generator is coupled to the engine and is operable in response to operation of the engine to produce a total electrical power, a primary load is electrically connected to the generator to receive a portion of the total electrical power, and a secondary load is selectively connected to the generator to receive a portion of the total electrical power. An insulated-gate bipolar transistor (IGBT) is positioned to selectively transition between a connected state and a disconnected state. The secondary load is connected to the generator when the IGBT is in the connected state and is disconnected from the generator when the IGBT is in the disconnected state.

In another construction, the invention provides a power generating set that includes a generator operable to produce a total electrical power, an engine operable in response to a flow of fuel to drive the generator and to produce a flow of exhaust gas having an exhaust gas temperature, and a particulate filter positioned to receive the flow of exhaust gas from the engine and to filter particulate matter from the exhaust gas. A primary load is electrically connected to the generator to receive a portion of the total electrical power, the primary load being cyclical in nature. A secondary load is selectively connected to the generator to selectively receive a portion of the total electrical power and a switching element is operable to selectively transition between a connected state and a disconnected state. The secondary load is connected to the generator when the switching element is in the connected state and is disconnected from the generator when the switching element is in the disconnected state. A controller is operable to vary the state of the switching element to maintain an engine parameter above a predetermined value for a predetermined portion of each cycle of the primary load to regenerate the particulate filter.

In yet another construction, the invention provides a method of operating a power generating set. The method includes operating an engine to drive a generator, generating a total electrical power during generator operation, and switching a switching element between a connected state and a disconnected state to selectively direct a portion of the total electrical power to a secondary load when the switching element is in the connected state. The method also includes directing the remaining total electrical power to a primary load, the primary load being cyclical in nature and regenerating a particulate filter by moving the switching element between the connected state and the disconnected state to maintain an engine parameter above a predetermined value for a predetermined portion of each cycle of the primary load.

In another construction, a power generating set includes an engine operable in response to a flow of fuel to produce a flow of exhaust gas, a generator coupled to the engine and operable in response to operation of the engine to produce a total electrical power, and a primary load electrically connected to the generator to receive a portion of the total electrical power, the primary load having a cyclical pattern. A battery bank is selectively connected to the generator to receive a portion of the total electrical power and an insulated-gate bipolar transistor (IGBT) is positioned to selectively transition between a connected state and a disconnected state. The battery bank is connected to the generator to charge the battery bank when the IGBT is in the connected state and is disconnected from the generator when the IGBT is in the disconnected state.

In yet another construction, a power generating set includes a generator operable to produce electrical power, an engine operable in response to a flow of fuel to drive the generator and to produce a flow of exhaust gas having an exhaust gas temperature, and a particulate filter positioned to receive the flow of exhaust gas from the engine and to filter particulate matter from the exhaust gas. A primary load is electrically connected to the generator to draw a first portion of electrical power from the generator, the primary load having a cyclical pattern and a battery bank is selectively connected to the generator to selectively draw a second portion of electrical power. A switching element is operable to selectively transition between a connected state and a disconnected state, wherein the battery bank is connected to the generator when the switching element is in the connected state and is disconnected from the generator when the switching element is in the disconnected state. A controller is operable to vary the state of the switching element to maintain the sum of the first portion of electrical power and the second portion of electrical power above a predetermined value for a predetermined portion of each cycle of the primary load such that the heat from the flow of exhaust is sufficient to one of passively regenerate or actively regenerate the particulate filter.

In still another construction, a power generating set includes a generator operable to produce a total electrical power, an engine operable in response to a flow of fuel to drive the generator and to produce a flow of exhaust gas having an exhaust gas temperature, a particulate filter positioned to receive the flow of exhaust gas from the engine and to filter particulate matter from the exhaust gas, and a primary load electrically connected to the generator to receive a first portion of the total electrical power that varies in a series of cycles between a maximum that is above a predetermined value and a minimum that is below a predetermined value. A battery bank is electrically connected to the generator to receive a second portion of the total electrical power, and a switching element is operable to selectively transition between a connected state and a disconnected state, wherein the battery bank is connected to the generator when the switching element is in the connected state and is disconnected from the generator when the switching element is in the disconnected state. A controller is operable to vary the state of the switching element to maintain the sum of the first portion of the total electrical power and the second portion of the total electric power above the predetermined value for a portion of each cycle, the portion of each cycle being sufficient to one of passively regenerate or actively regenerate the particulate filter.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
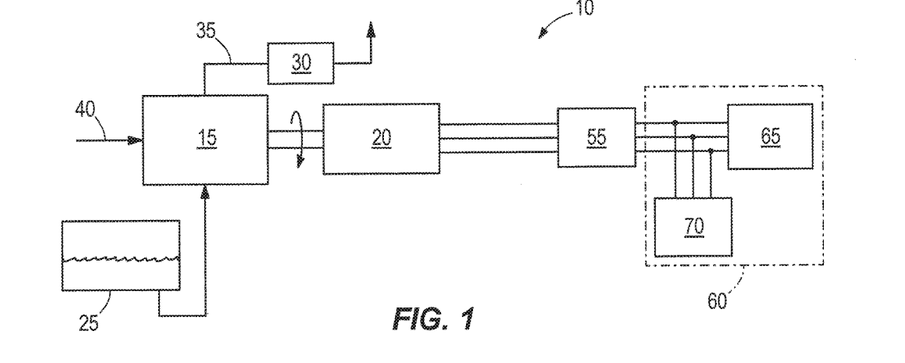
FIG. 1 is a schematic illustration of a diesel powered generator system.

FIG. 1 illustrates a system 10 that includes a diesel engine 15 that drives a generator 20. In the illustrated construction, the generator 20 is a three-phase AC generator 20 that is rotated at a desired speed to provide a three-phase current at a desired voltage (e.g., 480 volts) and a desired frequency (e.g., 60 Hz). In other constructions, asynchronous generators, synchronous generators, single-phase AC and DC generators or any other type of generator is powered by the diesel engine 15.

The diesel engine 15 includes a fuel tank 25 and a particulate filter 30 positioned in an exhaust stream 35 of the diesel engine 15. The fuel tank 25 contains a fuel supply that is directed to the engine 15 and combusted with a flow of air 40 to produce shaft power and the exhaust stream 35. The exhaust stream 35 includes a quantity of particulate matter (sometimes referred to as soot) that is preferably filtered rather than being emitted into the atmosphere. The quantity of particulate matter emitted is a function of the operating temperature of the engine 15, and in particular the exhaust temperature of the engine 15, with higher operating temperatures significantly reducing the amount of soot produced by the engine 15. The load on the engine 15, the generator 20, and the exhaust temperature of the engine 15 are closely related in this example and are used interchangeably herein. Thus, as described in this application, the diesel engine 15 is at a high temperature when operated at a high generator load and is at a low temperature when operated at a low load.

The particulate filter 30 includes any type of commonly used in-flow particulate filters for use with diesel engines 15. For example, the particulate filter 30 may include filters made using cordierite, silicon carbide, other ceramic fibers, or metal fibers that are arranged or woven to capture particles as the exhaust stream 35 flows through the filter. The particulate filter 30 may include a catalytic material that aids in the regeneration of the filter 30. Preferably, the filter 30 is capable of both passive and active regeneration.

Passive filter regeneration occurs when the load on the diesel engine 15 and therefore the exhaust temperature exceeds a temperature threshold 45. Above this level, sufficient energy is present within the filter 30 to oxidize the soot and other particulate matter collected. The duration required above the temperature threshold 45 is a function of the quantity of soot captured in the filter 30. Through extensive testing, it has been discovered that when powering a highly cyclic load such as the pump jack example described below, exceeding the threshold for between 10 percent and 30 percent of each cycle is sufficient to regenerate the filter 30 and remove the soot collected during the prior cycle. In a preferred condition, the temperature threshold 45 must be exceeded for only 20 percent of the total cycle. Thus, each cycle can regenerate the filter 30 and remove any soot collected during the prior cycle.

Active regeneration occurs and must be used when the engine 15 is operated at a load or exhaust temperature that remains below a level where passive regeneration can occur. During active regeneration, fuel is passed to the particulate filter 30 to increase the available energy and therefore the temperature within the filter 30 to aid in the combustion of the soot particles. While some regeneration occurs when the load or exhaust temperature is above a predetermined level 50, testing has shown that regeneration is not effective if performed below the predetermined level 50. In fact, when powering a highly cyclic load such as the pump jack described below, testing has shown that the load or temperature must remain above the predetermined level 50 for all or substantially all (greater than 90 percent) of the operating cycle of the load applied to the engine 15 in order for active regeneration to be effective.

Figure 2:
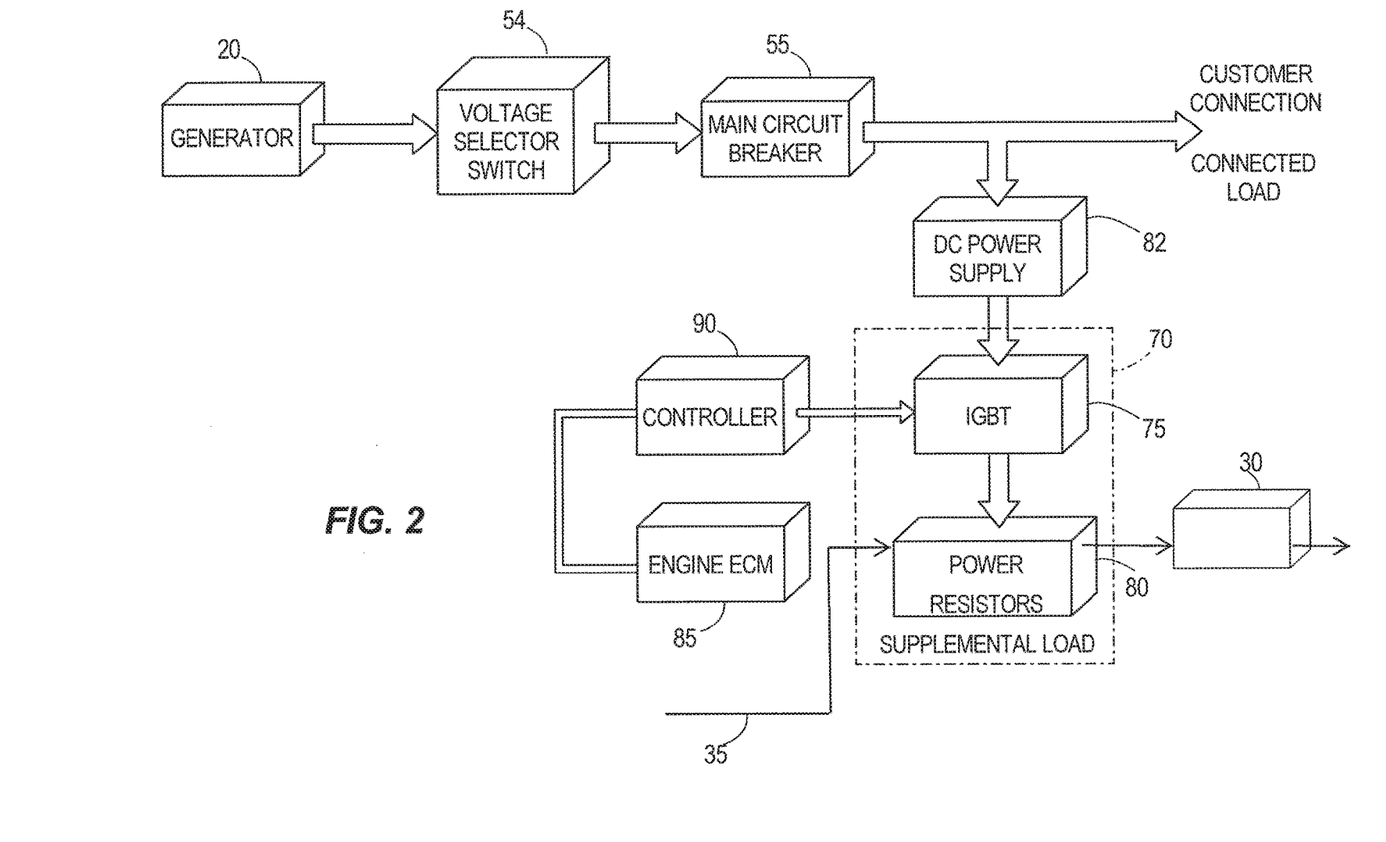
FIG. 2 is a flow chart illustrating a control scheme for the diesel powered generator system of FIG. 1.

In the construction of FIG. 2, the three phase power produced by the generator 20 is directed to a voltage selector switch 54 and then to a main circuit breaker 55 that can be manually controlled, automatically controlled, or both and is operable to separate the generator 20 from a total load 60 that is connected to an output side of the main breaker 55. The voltage selector switch allows the user to select the output voltage of the generator 20.

As illustrated in FIG. 1, the total load 60 is divided into a main load 65 and an auxiliary load 70. While the generator 20 is capable of driving virtually any electrical load, the invention is particularly advantageous when the main load 65 is highly cyclical. For example, generator systems of the type illustrated in FIG. 1 are often used to provide electrical power to motor driven pump jacks. In these arrangements, the motor is often the sole load or virtually the sole load such that the main load 65 follows a cyclic pattern.

Figure 3:
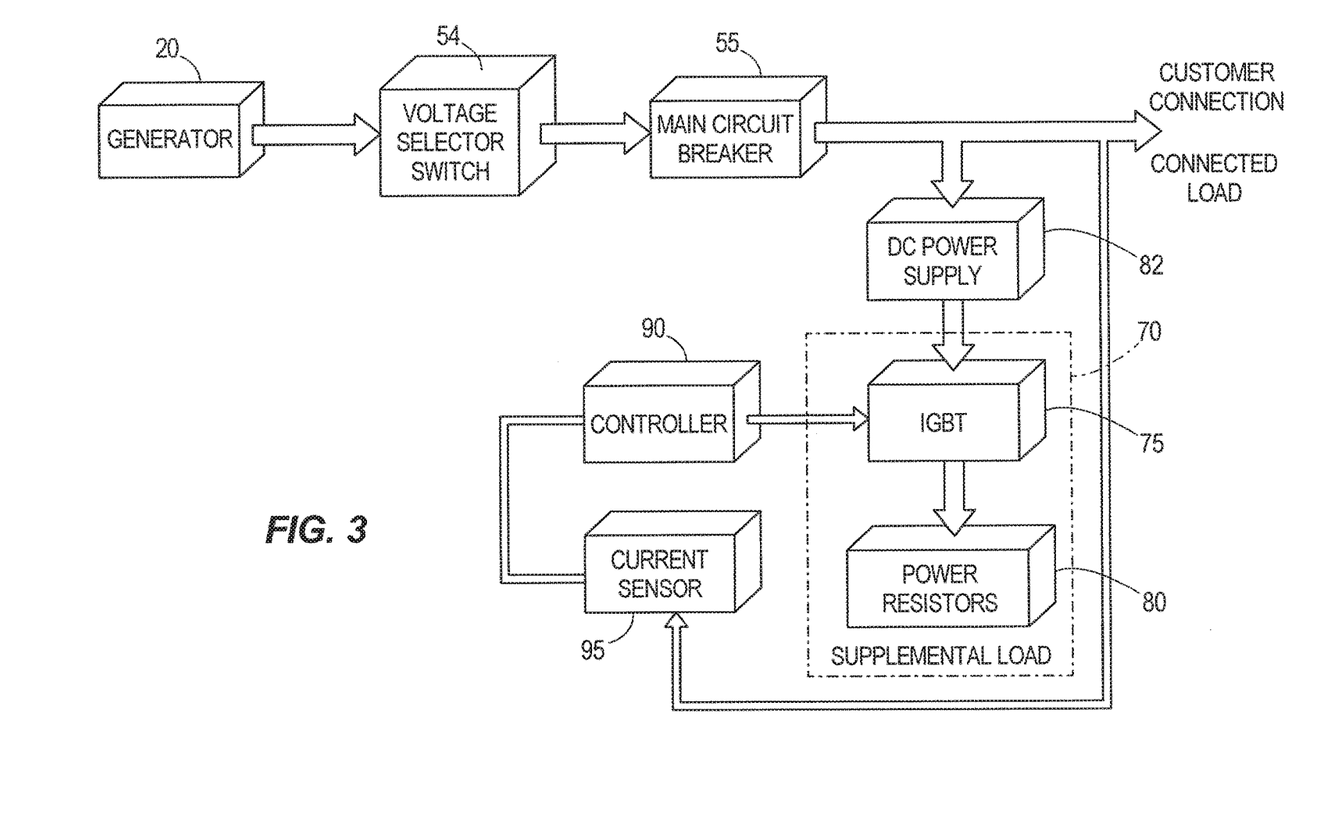
FIG. 3 is a flow chart illustrating another control scheme for the diesel powered generator system of FIG. 1.

As illustrated in FIG. 1, the auxiliary load 70 is applied to the generator 20 in parallel with the main load 65. As illustrated in FIGS. 2 and 3, the auxiliary load 70 includes one or more switching elements 75 connected to an electrical load 80. In the illustrated construction, the switching elements 75 include a single insulated-gate bipolar transistor (IGBT) that facilitates rapid switching to direct power to the electrical load 80 or to inhibit the flow of power to the electrical load 80. In the illustrated construction, the electrical load 80 includes one or more resistors that can be switched on and off individually or in groups. Thus, the illustrated arrangement provides fine control of the size of the auxiliary load 70 and can provide rapid and smooth changes in that size as will be discussed in greater detail.

FIG. 2 illustrates a three phase DC power supply 82 positioned between the main circuit breaker 55 and the switching elements 75. In the preferred construction, the switching element is an IGBT 75 that operates using DC power. Thus, the power supply 82 operates to convert the three phase AC power produced by the generator 20 to a single phase DC supply usable by the IGBT 75. In other constructions, AC switching elements may be employed, thereby eliminating the need for the DC power supply 82.

As noted above, the generator 20 produces a three phase output of electrical current at a desired voltage. An engine control system 85 operates to maintain the engine speed at the speed required to drive the generator 20 at the desired speed. In a direct drive arrangement, the diesel engine 15 rotates at the same speed as the generator 20. In some arrangements, a transmission is positioned between the generator 20 and the engine 15 to either step up or step down the speed of the generator 20 with respect to the engine 15.

With reference to FIG. 2, a controller 90 is coupled to the IGBT 75 and is operable to control the state of the IGBT 75 to control the level of the auxiliary load 70. The controller 90 adjusts the auxiliary load 70 via the IGBT 75 to maintain a level total load 60 on the generator 20 or to produce a peak load on the generator 20 as will be discussed with regard to FIG. 4. In a preferred construction, the controller 90 applies a pulse width modulation signal to the single IGBT 75 to turn it on for a predetermined portion of a period of time. When on, the full auxiliary load 80 is electrically connected to the generator 20. By pulsing the IGBT 75 on and off, the controller 90 is able to precisely control the average power consumed during the period of time to provide very fine control of the size of the auxiliary load 80. For example, if during a given time period (e.g., 1 second), a total resistive load 80 is applied via the IGBT 75 for half of the time period, the total resistive load applied to the generator 20 will effectively be half the load's actual size.

In another construction, the IGBT 75 is replaced by a number of switching elements and the load 80 includes a plurality of individual loads each switchable via one of the switching elements. During operation, select switching elements are switched to connect a respective load to achieve a desired auxiliary load level.

In the construction illustrated in FIG. 2 the engine electronic control module (ECM) 85 senses the speed or the load of the engine 15 and controls a fuel throttle valve to adjust the speed or load of the engine 15 as is known in the art. In addition, the ECM 85 provides one or more inputs to the controller 90 for use in setting the auxiliary load level 70. For example, in one construction the ECM 85 determines a total load on the engine 15 and sends a signal indicative of that load to the controller 90. The controller 90 then adjusts the auxiliary load level 70 until the engine load is above a predetermined level. In other constructions, other parameters (e.g., exhaust temperature, engine temperature, fuel flow rate, exhaust pressure, inlet pressure, etc.) are used to control the auxiliary load level. For example, yet another construction measures the current and voltage of the generator output to determine the total electrical power generated. The auxiliary load level 70 is easily measured, thereby allowing for a direct calculation of the main load level.

In addition, some parameters collected by the ECM 85 can be used to verify that the filter regeneration is effective. For example, one construction monitors the pressure drop across the filter 30 and adjusts the temperature, the time, the engine load, or other parameters of the operation in response to the measured pressure. In one arrangement, if the pressure drop exceeds a predetermined threshold, the time above the temperature threshold 45 is increased during passive regeneration and/or the predetermined level 50 for active regeneration is increased until the pressure drop returns to normal.

FIG. 3 illustrates another system that is similar to the system of FIG. 2 but includes a current sensor 95. The current sensor 95 does not replace the ECM 85 of FIG. 2 but rather is used to collect data that is then delivered to the controller 90 to control the IGBT 75. In the arrangement of FIG. 3, the current sensor 95 senses the level of power flowing to the main load 65 and feeds that information to the controller 90. The controller 90 then adjusts the pulse width to the IGBT 75 as required to achieve the desired level of total power 60 consumed. In still another construction, a temperature probe is placed in the engine exhaust flow 35 to measure the exhaust gas temperature. The temperature signal is then delivered to the controller 90 and the IGBT 75 is adjusted to raise or lower the auxiliary load 70 and the temperature as desired.

Figure 4:
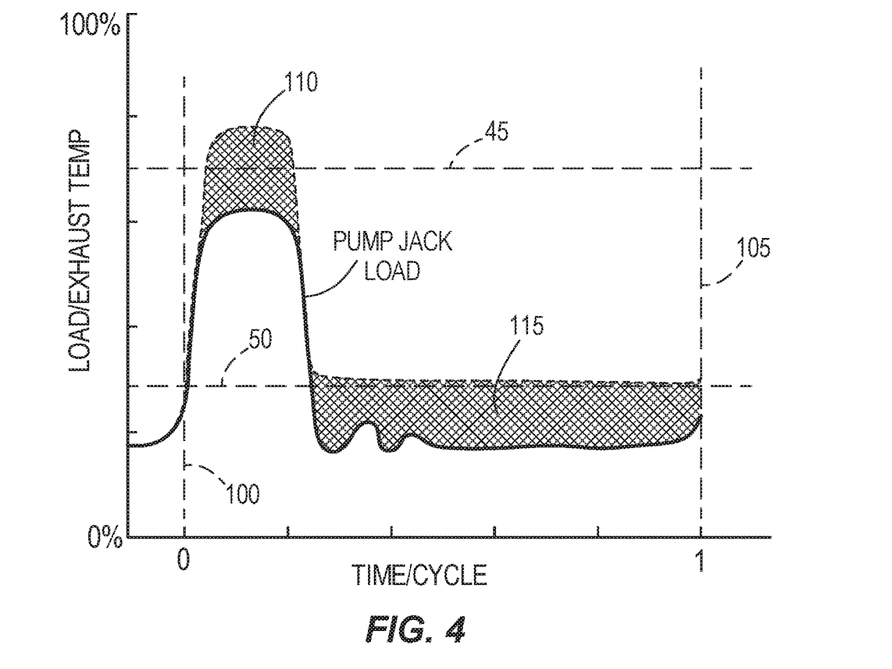
FIG. 4 is a graphical representation of a cyclic load and two possible auxiliary loads.

With reference to FIG. 4, the operation of the diesel driven generator system 10 for use in powering a highly cyclic load, in this example a pump jack, will be described. FIG. 4 is a graph of percent engine/generator load or percent exhaust temperature (with 0% being room temperature and 100% being the maximum exhaust temperature) versus time. The vertical broken lines identify the start 100 of and the end 105 of one pump jack cycle. A first horizontal broken line marks the lower threshold for passive regeneration 45 and a second horizontal line indicates the predetermined value for active regeneration 50.

As illustrated in FIG. 4, pump jacks rotate through a cycle that includes a first portion that requires a large power input followed by a second portion during which little or no power is required. During this first portion of the cycle, the motor is heavily loaded and thus draws a significant load from the generator 20. However, during the second portion of the cycle, very little electrical current is required. Thus, the pump jack consumes an average amount of power during its cycle. The motor and generator 20 powering these pump jacks are often sized to deliver significantly more than the average power level to assure that the components are capable of providing the power required in the first portion of the cycle. Because the pump jack is virtually the entire load on the generator 20, the diesel engine power output follows the pump jack curve and moves through a cycle with a short-time high-load peak followed by a low-load portion where the diesel engine 15 virtually coasts.

As can be seen, the pump jack cycle includes a short spike (about 20 percent of the cycle) that exceeds the predetermined level 50 for active regeneration but falls short of the threshold value 45 for passive regeneration. The load then drops below the predetermined level 50 for the remainder of the cycle. As discussed above, this cycle does not allow for passive regeneration, nor does it allow for effective active regeneration.

The controller 90 can be programmed to achieve either passive regeneration, active regeneration or both using the auxiliary load 70. To achieve passive generation, the controller 90 signals the IGBT 75 to add auxiliary load 70 during the peak load of the cycle. The added load, indicated by the first cross-hatched region 110 of FIG. 4 assures that the total load 60 on the diesel engine 15 exceeds the threshold level 45 for the necessary time or portion of the cycle to achieve passive regeneration. The auxiliary load 70 is then smoothly switched off and the total load 60 is allowed to drop to the lower level.

To achieve active regeneration, the controller 90 monitors the total load 60 on the generator 20 or the engine 15 and signals the IGBT 75 to add auxiliary load 70, shown as the second cross-hatched region 115, where needed to assure that the minimum total load 60 always remains above the predetermined level 50. The engine operation is also modified to assure that some fuel passes to the particulate filter 30 as is required for active regeneration.

In some constructions, the controller 90 uses both active and passive regeneration by adding load as necessary and as described with regard to the individual modes of regeneration. In addition, the engine control module can be used to determine when and how frequently regeneration must occur as well as which type of regeneration to perform if desired.

Figure 6:
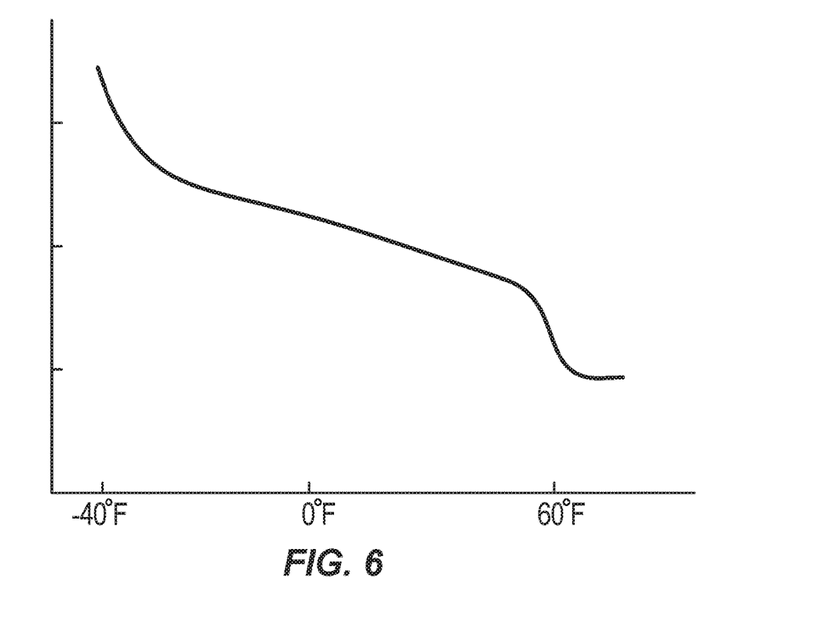
FIG. 6 is a graphical representation of the predetermined value for active regeneration versus ambient temperature.

FIG. 6 graphically illustrates how ambient temperature can effect regeneration and specifically the value or percent load of the predetermined value 50 for active regeneration. Typically, filter manufacturers recommend operation above a predetermined value 50 for active regeneration that is based on the lowest possible ambient temperature. However, in warmer ambient conditions, this can be a significant and excessive load on the engine 15. Thus, some constructions will vary the predetermined value 50 for active regeneration as illustrated in FIG. 6 based on a measured ambient temperature.

It should be noted that other types of loads 80 as well as other switching elements 75 could be employed if desired. For example, batteries could be used in place of resistors to provide a load.

Figure 5:
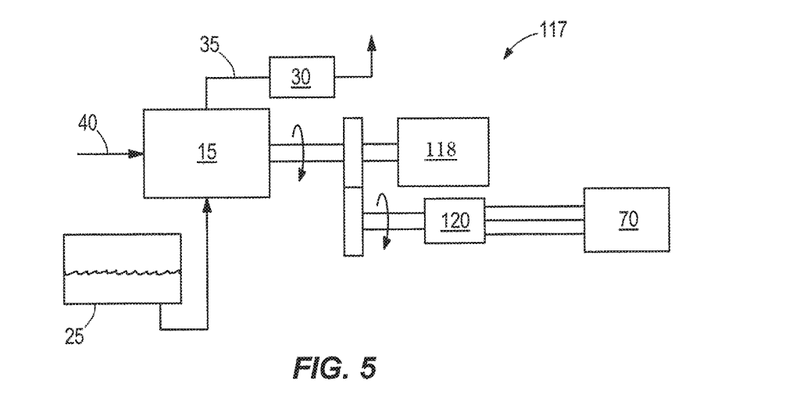
FIG. 5 is a schematic illustration of another diesel powered generator system.

FIG. 5 illustrates an alternative construction 117 in which the large generator 20 is replaced by the load which is mechanically driven by the diesel engine 15. For example, the load may be the transmission or drive system of a vehicle. A smaller generator 120 is simultaneously driven by the diesel engine 15, via a belt, gear, chain, or other interconnecting arrangement to provide an electrical current to an auxiliary load 70 that is similar to that described above. The auxiliary load 70 is switched in and out as described with regard to FIG. 4 to achieve the desired regeneration.

As discussed above, the auxiliary load 70 is used to increase the total load 60 on the engine 15 as required to achieve either passive or active regeneration. Regeneration is largely a function of the temperature of the exhaust gas 35 entering the filter 30. Thus, while the invention controls engine load and may measure various different engine or system parameters, those parameters are related to the engine exhaust temperature. In one construction, the performance of the system is further enhanced by placing the resistive load 80 directly in the exhaust flow stream 35 or adjacent the exhaust flow stream 35 to allow the heat produced by the resistors 80 to directly or indirectly heat the exhaust flow 35, thereby reducing the amount of auxiliary load 70 required to reach the predetermined level 50 or the temperature threshold 45.

Various features and advantages of the invention are set forth in the following claims.

What is claimed is:

1. A power generating set comprising:
an engine operable in response to a flow of fuel to produce a flow of exhaust gas;
a generator coupled to the engine and operable in response to operation of the engine to produce a total electrical power;
a temperature probe configured to measure a temperature of the exhaust gas;
a primary load electrically connected to the generator to receive a portion of the total electrical power, the primary load having a cyclical pattern;
a secondary load selectively connected to the generator to receive a portion of the total electrical power; and
an insulated-gate bipolar transistor (IGBT) positioned to selectively transition between a connected state and a disconnected state, wherein the secondary load is connected to the generator when the IGBT is in the connected state and is disconnected from the generator when the IGBT is in the disconnected state, and wherein in response to the measured temperature of the exhaust gas by the temperature probe, the IGBT switches between states to raise or lower the temperature of the exhaust gas.

2. The power generating set of claim 1, wherein the engine is a diesel engine and the total electrical power includes a three phase alternating current.

3. The power generating set of claim 1, further comprising a particulate filter positioned to receive the flow of exhaust gas from the engine and to filter particulate matter from the exhaust gas.

4. The power generating set of claim 3, wherein the IGBT switches between states to selectively connect and disconnect the secondary load to maintain an engine parameter above a predetermined value for a predetermined portion of each cycle of the primary load.

5. The power generating set of claim 4, wherein the engine parameter is an exhaust gas temperature, the predetermined value is a temperature threshold suitable for passive filter regeneration, and the predetermined portion of each cycle is between 10 percent and 30 percent.

6. The power generating set of claim 4, wherein the engine parameter is an exhaust gas temperature, the predetermined value is a temperature level suitable for active filter regeneration, and the predetermined portion of each cycle is at least 90 percent.

7. The power generating set of claim 6, further comprising a controller operable to vary operation of the engine to allow a portion of the flow of fuel to pass to the particulate filter for active filter regeneration and to control the state of the IGBT.

8. The power generating set of claim 1, further comprising a controller operable to apply a pulse width modulation signal to the IGBT to control the state of the IGBT.

9. A power generating set comprising:
   a generator operable to produce electrical power;
   an engine operable in response to a flow of fuel to drive the generator and to produce a flow of exhaust gas having an exhaust gas temperature;
   a particulate filter positioned to receive the flow of exhaust gas from the engine and to filter particulate matter from the exhaust gas;
   a primary load electrically connected to the generator to draw a first portion of electrical power from the generator, the primary load having a cyclical pattern;
   a battery bank selectively connected to the generator to selectively draw a second portion of electrical power;
   a switching element operable to selectively transition between a connected state and a disconnected state, wherein the battery bank is connected to the generator when the switching element is in the connected state and is disconnected from the generator when the switching element is in the disconnected state; and
   a controller operable to vary the state of the switching element to maintain the sum of the first portion of electrical power and the second portion of electrical power above a predetermined value for a predetermined portion of each cycle of the primary load such that the heat from the flow of exhaust is sufficient to one of passively regenerate or actively regenerate the particulate filter.

10. The power generating set of claim 9, wherein the switching element includes an insulated-gate bipolar transistor (IGBT).

11. The power generating set of claim 10, wherein the controller is operable to apply a pulse width modulation signal to the IGBT to control the state of the IGBT.

12. The power generating set of claim 9, wherein the engine parameter is an exhaust gas temperature, the predetermined value is a temperature threshold suitable for passive filter regeneration, and the predetermined portion of each cycle is between 10 percent and 30 percent.

13. The power generating set of claim 9, wherein the engine parameter is an exhaust gas temperature, the predetermined value is a temperature level suitable for active filter regeneration, and the predetermined portion of each cycle is at least 90 percent.

14. The power generating set of claim 13, wherein the controller is operable to vary operation of the engine to allow a portion of the flow of fuel to pass to the particulate filter for active filter regeneration.

15. A power generating set comprising:
   a generator operable to produce a total electrical power;
   an engine operable in response to a flow of fuel to drive the generator and to produce a flow of exhaust gas having an exhaust gas temperature;
   a particulate filter positioned to receive the flow of exhaust gas from the engine and to filter particulate matter from the exhaust gas;
   a primary load electrically connected to the generator to receive a first portion of the total electrical power that varies in a series of cycles between a maximum that is above a predetermined value and a minimum that is below a predetermined value;
   a battery bank electrically connected to the generator to receive a second portion of the total electrical power;
   a switching element operable to selectively transition between a connected state and a disconnected state, wherein the battery bank is connected to the generator when the switching element is in the connected state and is disconnected from the generator when the switching element is in the disconnected state; and
   a controller operable to vary the state of the switching element to maintain the sum of the first portion of the total electrical power and the second portion of the total electric power above the predetermined value for a portion of each cycle, the portion of each cycle being sufficient to one of passively regenerate or actively regenerate the particulate filter.

16. The power generating set of claim 15, wherein the portion of each cycle to passively regenerate the particulate filter is greater than 10 percent.

17. The power generating set of claim 15, wherein the portion of each cycle to actively regenerate the particulate filter is greater than 90 percent.

18. The power generating set of claim 15, wherein the switching element includes an insulated-gate bipolar transistor (IGBT).

19. The power generating set of claim 18, wherein the controller is operable to apply a pulse width modulation signal to the IGBT to control the state of the IGBT.

* * * * *